I. F. & F. C. BEERS.
THERMOSTAT.
APPLICATION FILED FEB. 23, 1910.

1,000,661.

Patented Aug. 15, 1911.

Witnesses
Edward J. Staut.
H. E. Chase

Inventor
I. F. Beers
F. C. Beers
By Haward P. Denison
Attorney

UNITED STATES PATENT OFFICE.

IRA F. BEERS AND FREDERIC C. BEERS, OF ROCHESTER, NEW YORK.

THERMOSTAT.

1,000,661.　　　Specification of Letters Patent.　　Patented Aug. 15, 1911.

Application filed February 23, 1910. Serial No. 545,471.

*To all whom it may concern:*

Be it known that we, IRA F. BEERS and FREDERIC C. BEERS, of Rochester, in the county of Monroe, in the State of New York, have invented new and useful Improvements in Thermostats, of which the following, taken in connection with the accompanying drawings, is a full, clear, and exact description.

This invention relates to certain improvements in thermostats for thermo-electric signals adapted to be used in connection with open or closed electric circuits for fire alarms and other purposes where it is desired to automatically operate one or more local or distant alarms or signals by variation in temperature above or below a predetermined degree.

The main object is to provide a simple and efficient thermo-electric signal system by which any excess of temperature above or below a predetermined degree at any distant point or points at which the thermostats are located may be indicated or announced by suitable signals or alarms at one or more receiving stations. In other words, we have sought to provide a thermo-electric signal system for the purpose described in which the efficiency of the service will be more permanent and reliable under all conditions of exposure by the constructing of a thermostat or thermostats in such manner as to effectively exclude dust, moisture and other foreign matter thereby permitting such thermostat to be installed in forests, orchards, tunnels, mines as well as in buildings, reservoirs and other places where it is desired to guard against excessive heat or cold.

The specific object therefore is to protect the structural elements of the thermostat against deterioration in exposed places.

Other objects and uses relating to specific parts of the device will be brought out in the following description.

Figure 1:
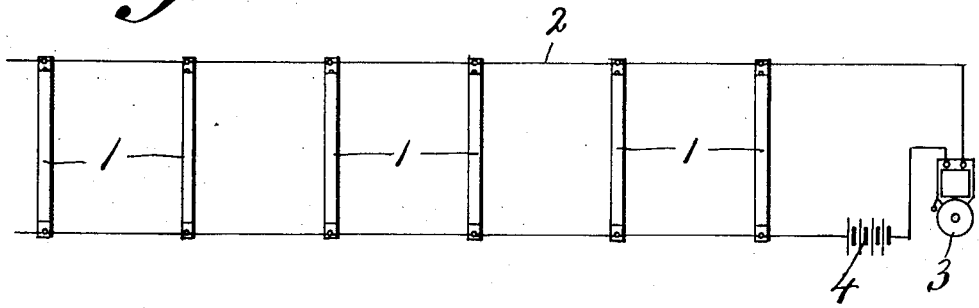
Figure 2:
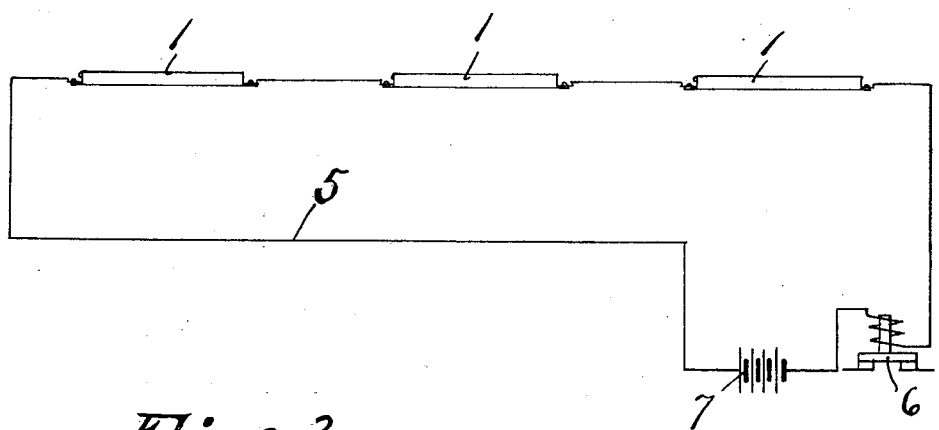
Figure 3:
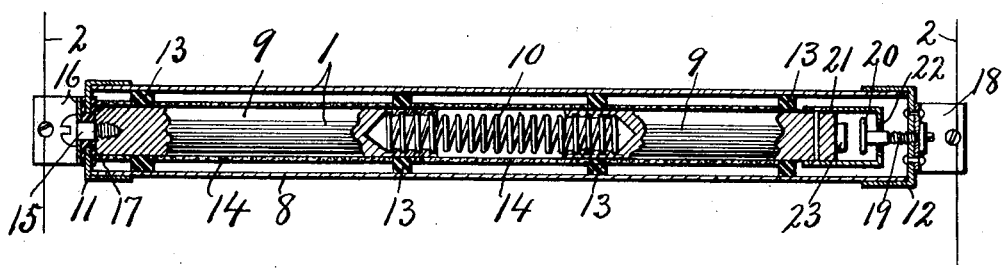

In the drawings: Figure 1 is a diagrammatic view of a thermo-electric signal system showing our improved thermostats as used in connection with an open electric circuit. Fig. 2 is a diagrammatic view of a similar alarm system showing the thermostats as used in connection with a closed circuit. Fig. 3 is an enlarged longitudinal sectional view partly in elevation of one of the thermostats.

In Fig. 1, we have shown a series of thermostats —1— as electrically connected across, or in parallel in, an open circuit —2— including therein a suitable signal as an electric bell —3—, the current being supplied to the circuit from any suitable source of electric energy, as a battery —4—.

In Fig. 2 we have shown a plurality of similar thermostats —1— as connected in a closed circuit —5— including therein a suitable relay —6— and source of electric energy, as a battery —7—, the relay —6— being adapted to operate any local or distant signal or alarm, not shown.

The thermostats are identical in construction and each consists of a thermostatic tube —8— and a thermostatic bar —9—, the latter being composed of coaxial sections connected together by a coil spring —10— and arranged centrally within and longitudinally of the tube —8—. This tube —8— and bar —9—, constituting the thermostatic couple and having different coefficients of expansion, are firmly secured together at one end but insulated from each other, while the remaining portions thereof are free to expand and contract relatively to each other under varying temperatures. The opposite ends of the tube —8— are closed by suitable caps —11— and —12— which together with the tube form a casing for inclosing the thermostatic bar —9— which is interposed between the heads —11— and —12— and is of somewhat smaller diameter than the interior diameter of the casing, so as to leave more or less intervening space between said bar and casing and entirely surrounding the bar to more effectively insulate the bar and tube from each other. The bar —9— is additionally held centrally within the casing —8— by means of insulating rings —13— which surround the bar or rod —9— at intervals throughout its length and serve to additionally insulate the rod or bar —9— from the casing —8—. This rod or bar —9— is also inclosed in a sheathing or coating —14— of asbestos or similar heat resisting material to prevent any external heat from reaching or acting upon the inner bar or rod —9— too quickly.

The end of the rod or bar —9— adjacent to the head —11— of the casing —8— is rigidly secured thereto by means of a screw —15— and clip plate —16— with a suitable interposed bushing —17— of insulating material to effectively insulate this portion of the rod or bar —9— from the head —11—. The screw —15— is screwed into a threaded aperture in the adjacent end of the rod or bar —9— and is therefore in electrical connection therewith, while the outer end or head of the screw engages and is in electrical contact with the clip plate —16—, which is made of electric conducting material and is secured to and forms an electrical connection with a bared portion of one side of the electric circuit —2—. The cap —12— at the opposite end of the casing is secured to and electrically connected with a similar clip —18— of conducting material which in turn is electrically attached to a bared portion of the opposite side of the electric circuit —2—.

A screw contact member —19— is adjustably secured centrally in a threaded aperture in the cap —12— and projects inwardly therefrom, its inner end being provided with an enlarged head —20— forming an electric contact piece which is electrically connected in the adjacent side of the circuit —2— through the medium of the wire-clip —18— to which it is connected. A sleeve —21— of electric conducting material is rigidly secured to the free end of the rod or bar —9— and is provided with an inturned contact flange —22— surrounding the screw —19— between the head —20— and cap —12—. The head —20— and flange —22— constitute coöperative contacts which are normally spaced a suitable distance apart, depending somewhat upon the difference in the coefficients of expansion between the two members —8— and —9— and also upon the temperature at which it is desired to close the circuit through the medium of said contacts. These coöperative contacts —20— and —22— are used when the thermostats are connected in an open circuit and, in order to adapt the same instrument to operate under a closed circuit, the free end of the rod or bar —9— is provided with an additional terminal contact —23— under which conditions the contact member —19— is adjusted so as to normally contact with the member —23—, the operation of which will be more fully hereinafter described.

The spring connection —10— between the adjacent ends of the coaxial sections of the bar —9— serves to prevent excessive strains upon or injury to the parts of the thermostat in case of excessive expansion and contraction of either of the thermostatic members after the contacts are engaged with each other.

It will be observed upon reference to the foregoing description and accompanying drawing that the tube —8— and its end heads or caps —11— and —12— together with the insulation —17— and screws —15— and —19— constitute a dust and moisture proof casing inclosing and protecting the interior mechanisms or parts, thereby permitting the thermostat as a whole to be used in the open and subjected to varying climatic conditions without deterioration or in any way diminishing its efficiency.

In operation assuming that the thermostats are connected in the manner shown in Fig. 1 for open circuit work and that they are set to close the circuit under a local temperature above a predetermined degree of, say 125° F., then the unequal expansion of the casing —8— and bar —9— will cause the members —20— and —22— to contact with each other, thereby establishing a short circuit through the thermostat from one side to the other of the circuit —2— thus effecting the operation of the signal or bell —3— which may be located at any distance from the thermostats.

If it is desired to use these thermostats in connection with closed circuit work, they are connected in series, as shown in Fig. 2, under which conditions the thermostats are adjusted so as to normally contact the member —20— with the member —23— under a predetermined degree of, say 125° F., whereupon any rise of temperature above such predetermined degree will cause the expansion of the casing —8—, thereby separating the contacts —20— and —23— and breaking the circuit to cause the operation of an alarm or other signal through the medium of a relay —6—. If on the other hand when the members —20— and —23— are in contact and the temperature should drop below such predetermined degree to any great extent, thereby causing a contraction of the tube —8—, the contacting members and parts connected thereto would be unduly strained or broken unless some provision was made to compensate for this excessive contraction and for this purpose we provide the spring connection —10— between the meeting ends of the section of the bar —9—, the ends of the spring entering suitable sockets in the adjacent ends of the bar sections and are interlocked with suitable grooves or threads in the sides of the socket, the ends of the bar sections being spaced apart sufficient distance to allow a limited compression of the spring under the excessive contraction of the casing, as previously mentioned. In like manner when the members —20— and —22— are brought into contact by the relative endwise movement of the parts —8— and —9— under a predetermined degree of temperature of, say 125° F., any excess of expansion of the casing due to a rise of temperature would cause abnormal separation between the sections of the bar —9—, thereby distending the spring —10— and it is therefore apparent that this spring while normally holding the sections of the bar —9— in operative relation to each other, serves to compensate for any excessive relative movement between the thermostatic members —9— and —12— above or below what is actually necessary to open or close the circuits in which the thermostats are connected.

The insulating rings —13— and also the insulating bushing —17— is preferably made of mica, although it may be made of any other suitable material capable of maintaining its efficiency under the action and exposure of the thermostatic elements.

What we claim is:

1. A thermostat comprising a tube, a thermostatic bar arranged within and centrally of said tube and formed of co-axial sections, a coil spring interposed between said sections for connecting them together, said tube and bar having different co-efficients of expansion, a cap upon each end of the tube, means for connecting one end of the tube to one end of the bar, means for insulating the connected ends of the tube and bar from each other, insulating rings arranged within the tube for supporting the bar, a covering of heat resisting material for the bar, a sleeve of conducting material secured to the free end of the bar and provided with a contact, an adjustable contact member carried by the cap at the free end of the tube and extending in the sleeve upon the bar, and electrical connections attached to said caps.

2. A thermostat comprising a tube, a thermostatic bar arranged within and centrally of said tube and formed of co-axial sections, a coil spring interposed between said sections for connecting them together, said tube and bar having different co-efficients of expansion, a cap upon each end of the tube, means for connecting one end of the tube to one end of the bar, means for insulating the connected ends of the tube and bar from each other, insulating rings arranged within the tube for supporting the bar, a covering of heat resisting material for the bar, a sleeve of conducting material secured to the free end of the bar and provided with a contact, an adjustable contact member carried by the cap at the free end of the tube and extending in the sleeve upon the bar, electrical connections attached to said caps, and a terminal contact secured to the free end of the bar and inclosed by said sleeve.

In witness whereof we have hereunto set our hands on this 14th day of February 1910.

IRA F. BEERS.
FREDERIC C. BEERS.

Witnesses:
M. M. TAIT,
FRANK B. KANE.

Copies of this patent may be obtained for five cents each, by addressing the "Commissioner of Patents, Washington, D. C."